Aug. 6, 1935. G. B. GOFF ET AL 2,010,229
HOSE CLAMP
Original Filed Oct. 22, 1931

Patented Aug. 6, 1935

2,010,229

UNITED STATES PATENT OFFICE 2,010,229

HOSE CLAMP

George B. Goff and Finas J. Finch, Oklahoma City, Okla.

Refiled for abandoned application Serial No. 570,278, October 22, 1931. This application June 10, 1935, Serial No. 25,965

2 Claims. (Cl. 251—5)

Our invention relates to hose clamps for restricting or entirely stopping the flow of water or other liquid through a hose, and more particularly to such a clamp for use on the usual fire hose.

The objects of our invention are to provide a device of this class which is new, novel, practical and of utility; which may be easily and quickly operated regardless of the liquid pressure being carried within a hose; which will be positive in action; which will be self-locking when in its clamping position; the handle of which will be in a substantially prone position when the device is in its clamping position; which will be so designed that when operated, the operating force will be exerted downwardly, thus permitting a person to use his entire weight if desired; the operation of which will require less force as the handle approaches its locked position, thus giving the effect of more power to the operator as the pressure in the hose increases due to the stifling effect of the operation of the clamp; the hose trough of which will be self-centering and will be close to the ground thus increasing the ease with which the hose may be placed in the trough; which may be used to entirely stop the flow of a liquid through a hose, or merely used to restrict such flow; which will be light in weight and easily transported manually; which will be compact and easily mounted for transportation on fire fighting equipment without requiring much space; which cannot be forced to travel along the hose by the liquid pressure therein; which will have few moving parts to become worn or get out of order; the parts of which all may be easily and quickly removed for replacement; which will not injure a hose; which will be comparatively cheap to manufacture; which will be strong and durable; and which will be efficient in accomplishing all the purposes for which it is intended.

With these and other objects in view as will more fully appear, our invention consists in the construction, novel features, and combination of parts hereinafter more fully described, pointed out in the claims hereto appended, and illustrated in the accompanying one-sheet drawing, of which:

Figure 1 is a side view of the device in its closed or clamping position;

Fig. 2 is a fragmentary plan view;

Fig. 3 is a side view of the device in its open position; and,

Fig. 4 is a fragmentary sectional view taken along the line 4—4 of Fig. 1.

Like characters of reference designate like parts in all the figures.

It is understood that various changes in the form, proportion, size, shape, weight and other details of construction, within the scope of our invention may be resorted to without departing from the spirit or broad principle of our invention and without sacrificing any of the advantages thereof; and it is also understood that the drawing is to be interpreted as being illustrative and not restrictive.

The present application is a substitute for application Serial No. 570,278, filed Oct. 22, 1931.

One practical embodiment of the invention as illustrated in the drawing comprises:

An elongated narrow base 1, its lower edge 2 adapted to rest upon the ground or other flat surface, and having an outstanding plate 3 adjacent one of its ends, the lower edge of which is in a plane with the lower edge of said base 1, and which acts as a means for preventing tilting of the base 1. The other end of said base 1 is provided with an arcuate plate or hose trough 4, which extends outwardly from each side of said base 1 and beneath its outer edges are provided legs 5, which act as a means for preventing tilting of the base. Intermediate its ends the base is provided with a handle 6. Adjacent said plate 4 said base 1 is rigidly provided with a pair of parallel upstanding side plates or brackets 7 and 8 which are attached to the base by a plurality of bolts or rivets 9. An axle 10 extends through the uppermost portion of said plates 7 and 8, and pivoted on said axle 10 is a lever arm 11 which is slightly longer than said base 1. An axle 12 extends through said plates 7 and 8 at a point slightly above the base 1 and journals one end of a tongue 13, the other end of which is provided with an arcuate shoe 14, the radius of which is equal to the radius of the trough in said plate 4. Said tongue 13 is located so as to cause said shoe 14 to fall within the arcuate groove of said plate 4. A flat spring 15 is firmly attached to the upper surface of said base 1 by a stud bolt or the like 16, and bears against the nether surface of said tongue 13 and acts as a means of normally holding said tongue out of contact with said plate 4. The pivoted end of said lever arm 11 is bifurcated and beneath the tines thereof is provided a roller 17 journaled on a shaft 18. If so desired a rigid shoe may be provided in place of said roller 17, however, it is thought a roller is preferable as it prevents considerable friction between the handle 11 and the upper surface of the tongue 13.

In operation the shaft 10 acts as a fulcrum for the lever arm 11. When the lever arm is substantially at right angles to the base 1 said tongue 13 is allowed to remain at the upper end of its throw, but as the lever arm 11 is manually forced downwardly toward said base 1, the roller 17 forces the tongue 13 downwardly toward the plate 4, and in so doing rolls along the upper surface of the tongue. A usual hose 19 will be placed upon said plate 4 and when it is desired to restrict the flow of a fluid through the hose, the free arm of the lever arm 11 will be forced downwardly toward said base 1, thus closing the flow hole of the hose as is best shown in Fig. 1. It may be seen that when the free end of said lever arm 11 is at the lower end of its throw the axis of said wheel 17 will be beyond dead center with respect to the shaft 18 and will consequently lock or hold the lever arm in its lowered position.

As a means for positioning the free end of said lever arm 11 at a desired point above the base 1 in order to only partially close the flow hole in the hose 19, we provide upon said plate 3 a pair of upstanding parallel brackets 20 between which is journaled a latch 21 on a pin 22. Said latch 21 at its upstanding portion is provided with a plurality of notches 23 which are adapted to be selectively engaged in a groove 24 in the adjacent side of said lever arm 11. The lower end of said latch 21 is provided with a perpendicular lever 25 beneath which is a flat spring 26 fastened to the plate 3 and bearing against the nether surface of said lever 25. It may be seen that by engaging the lever arm 11 with desired ones of said notches 23, the lever arm may be held in spaced relation to the base 1. When it is desired to release the pressure on hose 19, downward pressure on lever 25 will disengage said latch 21 with said lever arm 11, and the lever arm will be free to spring to a position substantially perpendicular to said base 1. This position is best illustrated in Fig. 2.

It is to be understood that all axles, shafts, bolts, and plates, as well as the trough and shoe may be made removable so that they may be easily and quickly removed, and we contemplate such structure.

From the foregoing description, it may be seen that these applicants have provided a hose clamp which will accomplish all of the purposes hereinabove set forth.

Obviously, the invention is susceptible of embodiment in forms other than that which is illustrated in the accompanying drawing and described herein, and applicable, for uses and purposes other than as detailed, and we therefore consider as our own all such modifications and adaptations and other uses of the form of the device herein described as fairly fall within the scope of our invention.

Having thus described our invention, what is claimed and desired to be secured by Letters Patent, is:

1. A hose clamp embodying a base, a smooth surfaced arcuate hose trough carried by the upper surface of one end of said base, a pair of parallel upstanding plates rigidly attached at their lower ends to said base adjacent said trough, a tongue having one end pivotally mounted between said plates above said base, an arcuate shoe carried by the free end of said tongue and adapted to seat within said trough, a lever arm carried by said plates for forcing said shoe into said trough, and means carried by said base for positioning the free end of said lever arm a desired distance from said base, said last mentioned means comprising an upstanding latch having its lower end pivotally mounted on said base adjacent the end to which the free end of the lever arm approaches, an actuating lever rigidly attached perpendicularly to the lower end of said latch, and a spring for normally holding the latch in engagement with said lever arm.

2. A hose clamp embodying an elongated base, means for preventing lateral tilting of said base, an arcuate hose trough carried by the upper surface of one end of said base, a pair of parallel upstanding plates rigidly attached at their lower ends to said base adjacent said trough, a tongue having one end pivotally mounted between said plates above said base, an arcuate shoe carried by the free end of said tongue and adapted to seat within said trough, a spring upon said base beneath said tongue for normally forcing the free end of said tongue upwardly away from said trough, a lever arm having one end pivotally mounted between the upper ends of said plates above the free end of said tongue, a roller carried by said lever arm and adapted to contact the upper surface of said tongue, said roller and lever arm adapted to force the free end of said tongue toward said trough when the free end of said lever arm is forced toward said base, an upstanding latch having its lower end pivotally mounted on said base adjacent the end to which the free end of the lever arm approaches, an actuating lever rigidly attached perpendicularly to the lower end of said latch, and a spring for normally holding the latch in engagement with said lever arm.

GEORGE B. GOFF.
FINAS J. FINCH.